United States Patent Office 3,309,437

Patented Mar. 14, 1967

1

2

3,309,437

METHOD OF PRODUCING BODIES FROM RAW PETROLEUM COKE

John P. Harnett, Chicago, Ill., assignor to Great Lakes Carbon Corporation, New York, N.Y., a corporation of Delaware No Drawing. Filed Aug. 28, 1961, Ser. No. 134,154
5 Claims. (Cl. 264—29)

This invention relates to a novel process for making baked or graphitized bodies out of raw petroleum coke. This invention further relates to such a process which is also substantially binderless or plasticizerless and which is also carried out without employing any substantial mechanical pressures.

It is an object therefore, of this invention to make such bodies by a process which involves no mixing operation, because it is binderless or plasticizerless.

It is another object of this invention to make such bodies by a process which involves no molding or extruding or mechanical pressure forming of any kind, either at relatively low or relatively high temperatures, because the bodies are produced without employing any substantial mechanical pressures.

It is another object of this invention to make such bodies out of raw petroleum coke particles with a minimum amount of crushing of said particles or alteration of the pore structure between said particles and with a minimum amount of internal strains set up within said bodies.

The making of baked or graphitized bodies out of raw petroleum coke is not new with the present invention. For example, the United States Swallen Patent 2,502,183 and the United States Bailey Patent 2,582,764 both teach the production of bodies out of raw petroleum coke. However, the methods of each of these patents involve the pressure forming of the raw petroleum particles, either without or with a plasticizer, when they are at an elevated temperature, in order to form them into a body—this technique resulting in a dense, coherent, shaped mass.

The present invention, on the other hand, does not employ this forming technique, or any other mechanical pressure forming procedures, and indeed, such techniques would destroy many of the purposes of this invention, such as the elimination of a molding or forming step, and also the reduction to a minimum of the crushing of the particles and of the alteration of the pore structure between same, or the minimization of strains set up within the bodies produced.

It is a finding of this invention that bodies may be produced out of raw petroleum coke by placing particles of this material in a container, which is adapted to be subjected to baking conditions and also to form the coke placed therein into a mass of desired configuration for subsequent utilization, and heating the container to a temperature exceeding 600° C. and preferably to a temperature between about 800° C. and about 1000° C. In order for the process to be feasible, however, and in order to produce bodies which are sound and strong, the raw petroleum coke employed should have a volatile matter content in the range of about 8% to about 25% by weight, and preferably from about 12% to about 18%, and be further characterized by an ability to form hard, strong, not easily abraded, agglomerated coke when it is heated to about 950° C. Further details regarding these characteristics and the methods followed in determining same are discussed hereinafter.

The container into which the raw petroleum coke particles having suitable qualities are placed prior to being heated should be made from a material which is adapted to be subjected to baking conditions, such as temperatures up to about 1000° C. Hollow cylinders, of any desired dimensions, made from graphite or stainless steel or cardboard are typical of their shapes and of suitable materials from which the containers are made. Because of relative costs and process efficiencies, containers made from graphite are generally preferred for small body sizes while stainless steel is generally preferred for large sized bodies. Containers having square or rectangular cross-sections may also, of course, be used, as may containers which define hollow, cylindrical tubes or spheres, etc.

The fully or partially charged cylindrical or otherwise shaped container or containers will typically be placed in a heating chamber where the container and its contents are heated to the desired temperature, such as to about 800° C., after which the heating is discontinued, and the container and its contents cooled, so that the body within same can be removed. During this cycle, the particles of raw petroleum coke fuse strongly together, and at the same time lose a large portion of the volatile matter which they originally contained. This process results in a formed porous body of low density and of relatively high strength, having the same geometrical configuration as the container but reduced in dimension from that of the unheated mass due to baking shrinkage. Baking temperatures in excess of at least 600° C. should be employed in order that the properties of the bodies produced be satisfactory.

Measures should also be taken so that oxidation of the bodies being produced and, preferably also their containers, is prevented or minimized. This can be accomplished in a number of ways, the particular method employed in any given case depending upon such factors as the design of the furnace used, the number of bodies being produced and their size, comparative economics, etc. In some cases, an inert gas such as nitrogen will be employed to rid the containers of air prior to and during the placing of the particles in same, or in the heating chamber during the heating step in order to minimize or prevent oxidation of the bodies being produced or their containers. At other times, a reducing atmosphere, provided by the combustion of gases, is employed for this purpose. The use of packing materials, such as graphite particles, to surround the containers, is also contemplated for this purpose. If packing materials are employed, the riddance or reduction of entrained air by vacuum or by flushing out with kerosene, etc., may also be resorted to if desired.

Also, containers substantially closed at the top and possessing only small sized vent openings may sometimes be used in order to minimize oxidation of the bodies being produced. Which of these measures, or other measures such as milling and crushing the raw petroleum coke in an inert atmosphere, or in combination of same, are employed, will depend as aforesaid, on the conditions encountered and the product requirements, etc., and the choice of same will be obvious to one skilled in the art.

Containers may also be employed which possess relatively light lids which rest upon the mass being heated but which permit the escape of volatiles between their sides and the walls of the container. In case such lids are employed, they are only heavy enough to help keep the dimensions of the body being produced relatively uniform during its shrinking, but not so heavy as to greatly affect other physical properties of the body being produced, such as its apparent density, porosity or strength. In other words, it does not exert, and cannot be considered as exerting, a substantial mechanical pressure upon the mass being processed.

After the bodies are removed from their containers, they may then sometimes be utilized in this condition, or machined or reduced in size if desired and then used, or they may be placed in a graphitizing furnace and heated, according to methods conventional in the art, to graphitizing temperatures between about 2000° C. and about 3000° C. Machining after graphitizing is also, of course, contemplated. Which of these operations are carried out will depend upon the final sizes and end use requirements of the bodies produced, such as for insulating blocks for high-temperature furnaces and reactors, filters, etc.

Substantially all of the raw petroleum coke particles placed in the container will preferably be of such a size that they will pass through a 4 mesh Tyler screen. The particles placed in any given container will typically also be closely sized, i.e., of such a particle size that they all pass through one size screen and are retained by a screen having openings only slightly smaller than the particles. For example all of the particles may be of such a size that they pass through a 4 mesh Tyler screen but are retained by an 8 mesh Tyler screen, the particle size in this case being designated as —4/+8. Particle sizes such as —3/+6, —8/+10, —20/+35, etc., are other examples. Petroleum coke flour may also be employed, the term "flour" being used to designate a material substantially all of which passes through a 48 mesh screen, and approximately 50 to 60% of which passes through a 200 mesh screen. Particles which have been prepared by a special micronizing technique and substantially all of which pass through a 400 mesh screen may also be employed. Various mixtures of different percentages of particles having sizes such as described above are also embraced within the invention and this will depend largely on the porosity and other characteristics which are sought for the bodies being produced and their particular end uses, such as whether they are to be used for coarse or fine filters, or insulating blocks, etc.

Substantially all of the particles, however, regardless of their size, should have a volatile matter content between about 8% and about 25% and preferably between about 12% and about 18%, determined by measuring the weight loss (exclusive of moisture) which takes place in heating the particles to 950° C. This test is typically carried out by placing a small quantity, such as five grams, of the particles in a crucible having a closely fitting top with a ½ millimeter circular hole through its center, and heating the crucible in a nitrogen atmosphere to about 300° C. at an upheat rate of 30° C./minute and then further heating the crucible to about 950° C. at an upheat rate of 10° C./minute, cooling the sample, and determining its loss in weight. The crucible is slightly tapered and measures about 1¼ inches long and 1¼ inches in diameter at its top.

If the volatile matter content of the particles is below about 8%, then insufficient fusion takes place during the heating step and any body produced is too weak to be of any utility but tends rather to crumble into a powder.

If the volatile matter content of the particles is above about 25%, then the mass tends to melt or flow or boil when heated pursuant to desired baking schedules, making them impractical for normal production methods.

Blends of the foregoing particles to give various desired average volatile contents such as 13% or 15% are also contemplated.

However, even when the particles employed possess the proper volatile matter content they may sometimes not function properly to produce bodies having desirable properties. Only raw petroleum cokes having a volatile matter content within the above range and which also form hard, strong (compressive strengths typically in excess of 5000 p.s.i.), not easily abraded, agglomerated cokes or plugs when heated to about 950° C. as above described are operative; the term "easily abraded" meaning that the main mass of the plug is comprised essentially of particles which can be loosened simply by squeezing it between one's fingers or by mildly scraping it against a hard surface. The ability to form plugs having these characteristics will generally, but not necessarily be possessed by most cokes, especially as they come directly from the delayed coker, but might be lost by some cokes which are stored in piles in the open air for extended periods of time and undergo weathering which adversely affects these properties. Or these characteristics might be absent because of the nature of the crude petroleum material cycled to the delayed coker. In either case, however, it is sometimes possible to blend off given percentages of these unsuitable or relatively weakly agglomerating cokes with cokes which form strongly agglomerated plugs in order to formulate particle mixtures which are suitable for this invention, such blending and the ranges thereof being considered within the skills of one working in the art, once the main teachings of this invention are before him.

The bulk density of the petroleum coke in the container will vary, and will depend somewhat on its particle size, but generally it will be between about 30 and about 40 lbs./cu. ft. determined in situ. It is also contemplated to vigorously jar or vibrate the container in order to densify the mass in the container prior to baking it, in which case the bulk density range will typically be between about 35 and 55 lbs./cu. ft. In either case, however, without or with vibration, the density of the mass which is heated and baked is considerably below the density of prior art pressed or pre-formed green bodies made from raw petroleum coke which are then heated and baked, and also considerably below the densities of the masses being baked in the processes of the Bailey and Swallen references.

The fact that the present process for making baked or graphitized bodies out of raw petroleum coke employs no extraneous binder or plasticizer, but rather employs autogenous bonding, and this without any substantial mechanical pressure, is novel with this invention and gives rise to several advantages, some of which have been indirectly referred to above, which are summarized below:

(a) Elimination of mixing of binder or plasticizer with raw petroleum coke particles;

(b) No interference properties of bodies being produced caused by an extraneous binder or plasticizer;

(c) No molding or extrusion step to form green bodies, thereby avoiding strains set up in bodies by these operations;

(d) Bodies produced are relatively isotropic because of absence of molding or extruding forces;

(e) No, or only slight, crushing of particles and impairment of desired porosity system, when closely sized particle systems employed;

(f) Relatively low density and high strength bodies able to be produced, which cannot be produced by processes of the prior art.

The following examples are set forth in order to more fully describe the process of the invention, and some of the special features and advantages thereof.

*Example 1*

Four pounds of raw petroleum coke flour possessing suitable agglomerating properties, having a particle size such that substantially 100% of same passed through a 48 mesh screen, and 60% through a 200 mesh screen, and having a volatile matter content of 13.8% was poured into a graphite tube, vibrated and then heated in a furnace in a nitrogen atmosphere to a temperature of about 950° C. at a baking rate of about 4° C. per hour. Upon being cooled and removed from the graphite tube, it was found that the particles had fused into a sound baked body having a good appearance and an apparent density of 1.25 g./cc. Upon further heating to a graphitization temperature of about 2500° C., the body still remained sound and of good appearance and possessed an apparent density of 1.38 g./cc.

*Example 2*

Example 1 was repeated, employing 25 pounds of raw petroleum coke flour of the same particle size and having substantially the same properties. The flour was poured into a stainless steel container, vibrated and heated in the same manner, but employing a baking rate of 5° C. per hour. The baked body produced had an apparent density of 1.18 g./cc., was sound, and of good appearance.

The procedures of Examples 1 and 2 were repeated but employing particles having various sizes and volatile matter contents and utilizing a cylindrical cardboard carton as a container. The sample weight of particles in each example was one pound. These additional examples are set forth in Table I.

TABLE I

| Example | Vol. Matter | Particle Size | Baking Rate (° C./hr.) | Baked (950° C.) A.D. | Baked Appearance |
|---|---|---|---|---|---|
| 3 | 13.7 | Flour | 17 | 1.27 | Sound and strong. |
| 4 | 13.7 | −4/+8 | 17 | 0.93 | Do. |
| 5 | 13.7 | −8/+10 | 17 | 0.93 | Do. |
| 6 | 18.3 | −4/+8 | 17 | 1.18 | Do. |
| 7 | 18.3 | −8 | 17 | 1.17 | Do. |
| 8 | 14.4 | −4/+8 | 17 | 1.01 | Do. |
| 9 | 14.4 | −8 | 17 | 1.27 | Do. |
| 10 | 17.7 | −4/+8 | 17 | 1.07 | Do. |
| 11 | 17.7 | −8 | 17 | 1.06 | Do. |
| 12 | 13.8 | Flour | 17 | 1.29 | Do. |

The bodies produced in Examples 4, 5, 6, 8, and 10, which were made from closely sized particles, were also characterized by their uniform porosity.

Not only is the process of this invention novel, but so also are the formed bodies produced therefrom for subsequent utilization, characterized as they are by their exceptionally low densities with concomitant high strengths, substantially isotropic properties, and substantial retention of initial particle selection and minimal crushing or alteration of same. They are also distinguishingly characterized by their absence of binder coupled with their substantial retention of initial particle selection. Prior art bodies, prepared for subsequent utilization such as filters or insulators, etc., if made from raw petroleum coke either with or without a binder, were made only by substantial pressing of the particles either before or during heating. This of course resulted in both substantially higher apparent densities than those of the bodies of this invention, or considerable alteration or crushing of the initial particles. On the other hand, if the bodies were made from raw petroleum coke particles by first calcining the particles and then mixing the calcined particles with a binder, then bodies of fairly low densities are admittedly producible, but these are distinguishable from the bodies of this invention by their relatively low strengths and also their extraneous binder core. More alteration of the initially selected particles if originally closely sized also takes place because of their also being mixed with a binder and formed prior to being baked. It therefore, also, is likely that more specialized techniques are necessary to produce bodies with uniform pore size and pore distribution when utilizing prior art practices than when proceeding in accordance with the methods of this invention.

It should be appreciated that the baking rate employed will vary depending upon the size and shape of the body being produced, and several other factors such as particle size, volatile content, etc., the main consideration being the avoidance of differential heat gradients within the body whereby a portion of the body such as the inner portion might be undergoing one phase such as becoming fusible, while another portion such as the outside has passed through the fusible or plastic stage and has become solid and started to shrink. In general, therefore, smaller bodies may be baked more rapidly than larger bodies because of the substantial absence of any heat gradient problem. Baking schedules will therefore be variable but because of the absence of extraneous binders and plasticizers, very rapid heating of the containers and their contents up to about 400° C. is possible, after which a temperature increase at a rate of about 20° C. per hour until the desired temperature is reached might be typical for the production of many bodies weighing up to a few pounds while rates slower than this will be employed to bake bodies of substantially greater size, such as bodies weighing around 100 pounds or more.

It is to be understood that the invention is not limited to the specific examples which have been offered merely as illustrative and that modifications may be made within the scope of the appended claims without departing from the spirit of the invention.

I claim:

1. A process for manufacturing a baked carbon body which comprises (1) placing a particulate starting material consisting essentially of raw petroleum coke into a container which is adapted to be subjected to baking conditions and which is also adapted to form the coke placed therein into a mass of desired configuration for subsequent utilization, and (2) heating said container under substantially non-oxidizing conditions to a temperature exceeding 600° C., the entire process being carried out with no extraneous binder or plasticizer, and without substantial mechanical pressure, the said starting raw petroleum coke having a volatile content in the range of about 8% to about 25% by weight, and being further characterized by forming a hard, strong, not easily abraded agglomerated coke when heated under substantially non-oxidizing conditions, to about 950° C.

2. A process according to claim 1 wherein the container possessing the particulate raw petroleum coke is subjected to a vibrating or jarring process prior to being heated.

3. A process acording to claim 1 wherein the particulate raw petroleum coke, used to make any particular body, is closely sized.

4. A process according to claim 1 wherein the volatile matter content of the raw petroleum coke is from about 12% to about 18%.

5. A process for manufacturing a graphitized carbon body which comprises (1) placing a particulate starting material consisting essentially of raw petroleum coke into a container which is adapted to be subjected to baking conditions and which is also adapted to form the coke placed therein into a mass of desired configuration for subsequent utilization, (2) heating said container under substantially non-oxidizing conditions to a temperature exceeding 600° C., and (3) further subjecting the formed and baked mass, under substantially non-oxidizing conditions, to graphitizing temperatures between about 2000° C. and about 3000° C., the entire baking process being carried out with substantially no extraneous binder or plasticizer, and without substantial mechanical pressure, the said starting raw petroleum coke having a volatile content in the range of about 8% to about 25% by weight, and being further characterized by forming a hard, strong, not easily abraded agglomerated coke when heated under substantially non-oxidizing conditions, to about 950° C.

References Cited by the Examiner

UNITED STATES PATENTS

| | | | |
|---|---|---|---|
| 1,276,429 | 8/1918 | Smith | 202—26 |
| 1,496,053 | 6/1924 | Illingworth | 201—6 |
| 1,840,491 | 1/1932 | Dietsche | 264—29 |
| 1,903,237 | 3/1933 | Johnston | 201—6 |
| 2,403,301 | 7/1946 | Richon | 264—29 |
| 2,502,183 | 3/1950 | Swallen | 264—29 |
| 2,582,764 | 1/1952 | Bailey | 264—29 |
| 2,661,326 | 12/1953 | Stillman | 201—5 X |
| 3,009,863 | 11/1961 | Angevine | 264—29 |

FOREIGN PATENTS

| | | |
|---|---|---|
| 160,313 | 12/1954 | Australia. |
| 624,329 | 1/1936 | Germany. |

MORRIS O. WOLK, *Primary Examiner.*

ALPHONSO D. SULLIVAN, M. H. SILVERSTEIN, *Assistant Examiners.*